UNITED STATES PATENT OFFICE.

JOSEPH C. W. FRAZER, WILLIAM W. HOLLAND, AND ELLIS MILLER, OF BALTIMORE, MARYLAND.

METHOD OF TREATING MINERAL SILICATES.

1,196,734.  Specification of Letters Patent.  Patented Aug. 29, 1916.

No Drawing.  Application filed May 10, 1916.  Serial No. 96,719.

*To all whom it may concern:*

Be it known that we, JOSEPH C. W. FRAZER, WILLIAM W. HOLLAND, and ELLIS MILLER, citizens of the United States of America, residing in the city of Baltimore, State of Maryland, have invented certain new and useful Improvements in Methods of Treating Mineral Silicates, of which the following is a specification.

This invention relates to a method of extracting from feldspars and other mineral silicates which contain alumina and potash, such as orthoclase, microcline, leucite, and sericite: (a) alumina in the form of a salt from which afterward other salts of aluminum and metallic aluminum may be derived; (b) potassium in the form of a salt from which other salts of potassium and metallic potassium may be derived; and (c) silica in a uniform and finely divided condition.

The process in its preferred form is as follows:

1st. The pulverized mineral is treated with a caustic alkali in solution in water.

2nd. The water is evaporated from the solution until a dry mixture is obtained. The purpose of the first and second steps is to secure an intimate admixture of the mineral and the alkali.

3rd. The intimate and dry mixture which has been obtained by treating the mineral with an aqueous solution of a caustic alkali and afterward evaporating the water, is heated under the prevailing atmospheric pressure—usually about two hours—at temperatures which vary for the different silicates, averaging 250 degrees, and for the common known silicates range between 185 and 350 degrees centigrade. This treatment which does not involve fusion of the materials, the temperature not being sufficiently high, results in the production of a solid mass consisting of a portion which is soluble in water, and a portion which is nearly insoluble in water. The soluble portion contains any excess of alkali which may have been used in the digestion and approximately one-third of the silica which was in the original material. The silica withdrawn from the original silicate through the digestion with alkali in the dry state and within the prescribed temperature limits, is in the form of a silicate or of silicates of the alkali which was employed in the digestion. Under proper regulation of the temperature during the digestion, the soluble portion does not contain much, if any, of the alumina. The water-insoluble product of the digestion consists of a new silicate, or of new silicates, which differ so radically from the original mineral or minerals as to constitute new mineral species. The new silicate or silicates have been derived from the original minerals by the abstraction of a portion of the silica or silicic acid by the treatment we have described. They are, therefore, more "basic" than the original materials from which they were derived.

The most important characteristics of the new silicates contained in the water-insoluble product of the digestion are: (a) that they contain the more valuable constituents of the original materials except in so far as a portion of the silica has been withdrawn in the manner described, and a portion of the original alkali constituents may have been replaced by an equivalent amount of the alkali which was employed in the digestion; (b) that they can be readily and completely decomposed by the ordinary mineral acids with direct conversion of the more valuable constituents, potash and alumina, into the desired salts, and with the liberation of the silica in the form of free silicic acid.

4th. The fourth step in the process consists in the separation of the water-soluble and water-insoluble products of the digestion. For this purpose, the product of the digestion is treated with water and the separation is effected by filtration and by washing the insoluble portion.

5th. The fifth step in the process is for the recovery of the alkali which was neutralized by the silica withdrawn from the original minerals. For this purpose, the solution obtained as described above, is treated with lime or slaked lime in a quantity equivalent to the silica to be removed. The silica is thereby precipitated in nearly insoluble condition as a silicate of calcium, while the alkali previously in combination with it is liberated in the caustic condition and therefore in a suitable state for employment in a subsequent digestion. The precipitated calcium silicate is freed from the caustic, or "causticized" alkali by filtration and washing.

6th. The water-insoluble product of the digestion of the dry mixture of mineral and alkali within the prescribed temperature limits consists, as stated above, of a new silicate or of new silicates which contain approximately two-thirds of the silica and nearly all of the alkali and alumina contents of the original material, though, as previously stated, a portion of the original alkali content may have been exchanged for an equivalent quantity of the alkali employed in the digestion. The sixth step in the process has for its object the removal of the alkali content of the new silicates. The separation is effected by treating the material from which the alkali is to be withdrawn with a quantity of some mineral acid which is equivalent to the alkali content of the new silicates, the acid being selected according to the salt which it is desired to obtain. The salts of the alkalis so obtained are soluble in water and are separated from the undissolved residue containing the alumina and about two-thirds of the silica of the original minerals by treatment with water, filtration and washing.

7th. The residue, after the withdrawal of the alkali from the new silicates, contains the alumina and approximately two-thirds of the silica of the original material. The seventh step in the process has for its object the separation of the alumina from the silica. For this purpose, the substance is treated with a quantity of acid (usually sulfuric acid) which is equivalent to the alumina content, and the products of the treatment with the acid are evaporated to dryness and thereafter gently heated in order to render the silica anhydrous and insoluble in water. The water-soluble salt of aluminum is then separated from the water-insoluble silica by treatment with water, filtration, and washing. The silica is left in a finely divided condition and in a state of purity which renders it useful for many purposes.

The broad and important differences between this process and most of the previously proposed processes of similar ultimate purposes is that the latter have for their object the complete decomposition of the silicates by treatment with alkaline bodies whereby the whole of the silica and alumina contents of the minerals are converted into compounds containing chemically equivalent quantities of alkali. Such complete decompositions of silicates involve the consumption of large quantities of alkali and the maintenance of high temperatures which are expensive; or, if solutions of the alkalis are employed, the heating of the reacting substances under high pressures, which is both dangerous and expensive. Moreover, complete decomposition of the silicates by alkaline bodies involves the production of compounds and mixtures from which the valuable constituents can be recovered in the desired forms only by costly chemical treatment. On the other hand, the process herein described is novel in that a complete decomposition of the silicates is carefully avoided. The object sought is to effect, with the least possible expenditure of chemical energy, the conversion of the natural mineral silicates, which are not attacked by ordinary acids, into new silicates, which are readily attacked by any of the usual mineral acids, and thus to make it possible to extract the valuable constituents in the desired combinations by simple, direct and inexpensive methods. By the conversion of the original materials in the manner described, a large proportion of the alkali which is used up in the previously known processes is saved. The amount of alkali required to effect the change in the composition of silicates which we seek by our process, is only about two-ninths of that which would be required to effect a complete decomposition of the same silicates. The employment of the moderate temperatures which are necessary in order to avoid unnecessarily deep-seated and wasteful decompositions of the silicates, results in a very considerable saving of fuel.

Having thus described our invention and having explained the purpose of each step in our process, what we claim and desire to secure by Letters Patent is:

1. A process of extracting the aluminum and potassium contents of feldspar and other mineral silicates which consists in heating an intimate mixture of the feldspar or other mineral silicate and a caustic alkali in a dry condition and under atmospheric pressure, at temperatures between 185 and 350 degrees centigrade, whereby a portion of the silica content of the mineral is abstracted and new silicates are formed, separating the water-soluble and the water-insoluble products of such heating by treatment with water, filtering and washing, extracting the alkali content of the water-insoluble product of the heating by treating it with a quantity of an acid which is equivalent to the alkali therein contained, treating with water, filtering, and washing, and extracting the aluminum from the water-insoluble residue, which remains after the removal of the alkali, by treating the same with a quantity of an acid equivalent to the aluminum therein contained, evaporating the products of the last-mentioned treatment with acid to dryness, and heating the dried material, and finally separating the soluble aluminum salt from the insoluble silica by treating with water, filtering and washing with water.

2. A process of extracting the aluminum and alkali constituents of felspar and other mineral silicates which consists in heating an admixture of the silicate and a caustic alkali in the dry condition under the prevailing atmospheric pressure, whereby a portion of the silica or silicic acid of the mineral is abstracted in the form of a silicate of the alkali employed and the residual silica and the other constituents of the original mineral combine to form a new silicate or new silicates readily decomposable by the ordinary mineral acids yielding salts of the basic constituents of the silicate.

3. A process of extracting the aluminum and alkali constituents of feldspar and other mineral silicates which consists in heating an admixture of the silicate and a caustic alkali whereby a portion of the silica or silicic acid of the mineral is abstracted and the residual silica or silicic acid and the other constituents of the original mineral combine to form a new silicate or new silicates decomposable by the ordinary mineral acids yielding salts of the basic constituents of the silicate.

4. A process of extracting the aluminum and alkali constituents of feldspar and other mineral silicates which consists in heating an admixture of the silicate and a caustic alkali in the dry condition under the prevailing atmospheric pressure at a temperature of between 185 and 350 degrees centigrade, whereby a portion of the silica of the mineral is abstracted in the form of a silicate of the alkali employed and the residual silica and the other constituents of the original mineral combine to form a new silicate or new silicates which are nearly insoluble in water but are readily decomposed by the ordinary mineral acids yielding salts of the basic constituents of the silicate and liberating the silica.

5. A process for the conversion of mineral silicates, such as orthoclase, microcline, and other so-called "acid silicates" into more "basic silicates," which consists in heating an intimate mixture of the silicate with a caustic alkali at a temperature which suffices for a withdrawal of a portion of the silica in the form of a silicate of the alkali employed but which is not high enough to effect a deep-seated decomposition of the silicate.

6. A process for the conversion of mineral silicates, such as orthoclase, microcline, and other so-called "acid silicates" into more "basic silicates" by the abstraction of a portion of the silicic acid whereby new silicates are obtained which contain a relatively higher proportion of the basic constituents, which consists in heating an intimate mixture of the silicate with a caustic alkali at a temperature between 185 and 350 degrees centigrade.

7. A process for the conversion of natural mineral silicates which consists in heating the silicates with a caustic alkali at definite and comparatively low temperatures which are below the fusing point of the material, thus converting silicates which are not readily attacked by mineral acids into more basic silicates which are easily decomposed by such acids, regulating the temperature so that it is high enough to effect the desired reaction and low enough to prevent any wasteful decomposition of the silicates.

8. A process for obtaining salts of the alkaline metals from mineral silicates, such as orthoclase, microcline, sericite and other alkali-bearing silicates, which consists in treating the finely pulverized silicate with an aqueous solution of a caustic alkali, evaporating the water, heating the mixture to a temperature which suffices for the abstraction of about one-third of the silica in the form of a silicate or silicates of the alkali which is employed, but which is not high enough to effect a more extended decomposition of the silicate or silicates so treated, and which suffices also for the conversion of the remaining silica and the basic constituents of the original silicates into new and more basic silicates easily decomposable by mineral acids, separating the water-soluble and water-insoluble products of the heating by treatment with water, filtration and washing, recovering the alkali from the dissolved material, treating the new silicate or silicates produced with a quantity of acid which is equivalent to the alkali therein contained, thereby converting the alkali content of the new silicate or silicates into a salt or salts of the acid employed, then separating these from the water-insoluble residue by dissolving in water and by filtration and washing.

9. A process for obtaining salts of aluminum from mineral silicates, such as orthoclase, microcline, sericite and other alkali- and alumina-bearing silicates, which consists in heating the minerals with a caustic alkali, at substantially atmospheric pressure and at a temperature below the point of fusion of the material but high enough to convert the silicates into more basic silicates readily attacked by mineral acids, washing, and treating the residue with acid to the amount of the chemical equivalent of the alkali, filtering and washing, treating the nearly water-insoluble residue with a quantity of acid, selected according to the salt of aluminum which it is desired to form, which is equivalent to the alumina content of the residue, the products of such treatment with acid being then evaporated to dryness, and gently heated for the purpose of dehydrating the silica and rendering it insoluble in water, and finally, separating the water-soluble salt of aluminum from the water-insoluble silica by treatment with water.

10. A process for the recovery of silica in a finely divided condition from mineral silicates, such as orthoclase, microcline, sericite, and other alkali- and alumina-bearing minerals, which consists in removing a small portion of the silica by heating minerals with caustic alkali, forming a more basic silicate, washing, treating the residue with acids and washing to remove the salts of the alkalis and aluminum, and purifying the silica which remains after the separation of the salts of the alkalis and of aluminum.

Signed by us at Baltimore, Maryland, this 10th day of May 1916.

JOSEPH C. W. FRAZER.
WILLIAM W. HOLLAND
ELLIS MILLER.

Witnesses:
EDWIN K. SAMUELS,
ZELLA KUHN.